US009855820B2

(12) United States Patent
Baron, Jr. et al.

(10) Patent No.: US 9,855,820 B2
(45) Date of Patent: Jan. 2, 2018

(54) INTELLIGENT VEHICULAR OCCUPANT SAFETY METHOD

(71) Applicant: INTERNATIONAL BUSINESS MACHINES CORPORATION, Armonk, NY (US)

(72) Inventors: Rudolph C. Baron, Jr., Kennesaw, GA (US); Rhonda L. Childress, Austin, TX (US); Christopher W. Ecks, Westminster, CO (US); William A. Grimes, Fishers, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/615,878

(22) Filed: Jun. 7, 2017

(65) Prior Publication Data

US 2017/0297411 A1  Oct. 19, 2017

Related U.S. Application Data

(63) Continuation of application No. 15/097,581, filed on Apr. 13, 2016.

(51) Int. Cl.
*B60H 1/00* (2006.01)
*B60K 28/00* (2006.01)
(Continued)

(52) U.S. Cl.
CPC ......... *B60H 1/00742* (2013.01); *B60H 1/008* (2013.01); *B60J 1/17* (2013.01);
(Continued)

(58) Field of Classification Search
CPC ... B60K 28/02; B60W 40/08; B60H 1/00742; B60H 1/00735; B60H 1/008
See application file for complete search history.

(56) References Cited

U.S. PATENT DOCUMENTS

| 5,333,703 A | 8/1994 | James et al. |
| 5,581,234 A | 12/1996 | Emery et al. |

(Continued)

FOREIGN PATENT DOCUMENTS

| EP | 1669251 A1 | 6/2006 |
| EP | 1816025 A2 | 11/2006 |

(Continued)

OTHER PUBLICATIONS

Riordan, "Patents; A car temperature alarm is designed to cry out to save the life of a child who cannot" New York Times, Aug. 30, 1994.
(Continued)

*Primary Examiner* — Michael J Zanelli
(74) *Attorney, Agent, or Firm* — Weitzman Law Offices, LLC

(57) ABSTRACT

A vehicle occupant safety method involves receiving data from multiple sensors including at least one carbon monoxide (CO) sensor and GPS sensor; wherein, when a specified danger condition relating to CO level alone, or in combination with vehicle interior temperature, exists, and based upon the sensor data, causing the vehicle component controls to modify operation of at least one vehicle component; d) determining i) based upon further sensor data, that the specified danger condition either: A) is persisting, or B) has exceeded at least one specified severity threshold; and ii) using GPS location information from the GPS sensor, whether or not the vehicle is in an unsafe location, whether the vehicle is occupied, and where any occupants are located; continuing to make determinations regarding the specified danger condition; and, based upon a result of the determinations in taking further control actions until the specified danger condition no longer exists.

1 Claim, 3 Drawing Sheets

(51) Int. Cl.
*B60J 1/17* (2006.01)
*B60J 7/00* (2006.01)
B60W 40/08 (2012.01)
B60K 28/02 (2006.01)

(52) U.S. Cl.
CPC ............. *B60J 7/00* (2013.01); *B60H 1/00735* (2013.01); *B60H 1/00814* (2013.01); *B60H 1/00821* (2013.01); *B60K 28/02* (2013.01); *B60W 40/08* (2013.01)

(56) References Cited

U.S. PATENT DOCUMENTS

| | | |
|---|---|---|
| 5,711,574 A | 1/1998 | Barnes |
| 5,720,519 A | 2/1998 | Barnes |
| 5,739,756 A | 4/1998 | Maragulies |
| 5,960,523 A | 10/1999 | Husby et al. |
| 6,057,755 A | 5/2000 | Phillips |
| 6,208,256 B1 | 3/2001 | Flemig et al. |
| 6,301,977 B1 | 10/2001 | Stojanovski |
| 6,448,888 B1 | 9/2002 | Horner et al. |
| 6,854,415 B2 | 2/2005 | Barnes et al. |
| 6,922,147 B1 | 7/2005 | Viksnins et al. |
| 6,922,622 B2 | 7/2005 | Dulin et al. |
| 6,924,742 B2 | 8/2005 | Mesina |
| 6,940,400 B2 | 9/2005 | Pelletier |
| 7,012,533 B2 | 3/2006 | Younse |
| 7,348,880 B2 | 3/2008 | Hules et al. |
| 7,463,161 B2 | 12/2008 | Griffin et al. |
| 7,472,554 B2 | 1/2009 | Vosburgh |
| 7,710,277 B2 | 5/2010 | Wilson |
| 8,038,213 B2 | 10/2011 | Owens |
| 8,217,796 B2 | 7/2012 | Trummer |
| 8,618,926 B1 | 12/2013 | Thompson |
| 8,698,639 B2 | 4/2014 | Fung et al. |
| 8,803,677 B1 | 8/2014 | Miller |
| 9,000,907 B1 | 4/2015 | Rembach et al. |
| 9,290,174 B1 | 3/2016 | Zagorski |
| 2007/0008083 A1 | 1/2007 | Berg et al. |
| 2007/0279206 A1 | 12/2007 | Singfeld |
| 2008/0004774 A1 | 1/2008 | Wieczorek et al. |
| 2011/0109462 A1 | 5/2011 | Deng |
| 2013/0033373 A1 | 2/2013 | Thomas |
| 2013/0109342 A1 | 5/2013 | Welch |
| 2014/0015664 A1 | 1/2014 | Watson |
| 2014/0074383 A1 | 3/2014 | Frey |
| 2014/0139330 A1 | 5/2014 | Kleinstuck |
| 2015/0032266 A1* | 1/2015 | Weast ................ B60H 1/008 700/276 |
| 2015/0057912 A1 | 2/2015 | Ortmann et al. |
| 2015/0137962 A1 | 5/2015 | Binnicker |

FOREIGN PATENT DOCUMENTS

| | | |
|---|---|---|
| WO | 9415807 A1 | 7/1994 |
| WO | 9502526 A1 | 1/1995 |

OTHER PUBLICATIONS

"Dogs in hot cars," http://the animalalarm.com/en/dogs-in-hot-vehicles/ Apr. 4, 2016.
"K-9 Vehicle Heat Alarm Systems by ACEK9," http://projectpawsalive.org/the-equipment/k-9-heat-alarms-for-k-9-unit-vehicles/ Apr. 12, 2016.
Augenbraun, CBS News, "How technology could help prevent kids' deaths in hot cars," http://www.cbsnews.com/news/how-technology-could-help-prevent-kids-deaths-in-hot-cars/ Jul. 10, 2014.

* cited by examiner

INTELLIGENT VEHICULAR OCCUPANT SAFETY METHOD

CROSS REFERENCE TO RELATED APPLICATIONS

This application is a continuation of U.S. patent application Ser. No. 15/097,581 the entirety of which is incorporated herein by reference.

FIELD OF THE INVENTION

This disclosure relates generally to vehicles and, more particularly, to protection of vehicle occupants under certain conditions.

BACKGROUND

Temperatures in a parked car, even with the windows cracked, can heat up to over 120 degrees Fahrenheit within 15 minutes when the ambient temperature outside is 80 degrees.

On average 37 children per year die from vehicular heatstroke in the US, mostly attributed to either being unintentionally or intentionally left in the vehicle by an adult, or playing in unattended vehicle. Children are not the only ones at risk from being left in vehicles, Older adults and persons with chronic medical conditions are particular susceptible to extreme temperatures both heat related illnesses (heat cramps, heat exhaustion, heat syncope, or heatstroke) as well as hyperthermia. Heat related deaths and injuries to pets are also major issues, and while there is no formal tracking for pet heat-related deaths from being left in vehicles, it clearly happens too often.

While temperature related deaths are a major issues it is not the only risk when children, adults or pets are left in unattended vehicles, carbon monoxide poisoning also claims hundreds of lives a year from people sitting in running cars with faulty exhaust systems or in closed in spaces.

More recently, alarms have become available that notify a person, typically the vehicle owner, when someone has been left in a parked vehicle. However, such notifications are often ineffective because that person typically already knows that fact and, thus, may ignore any notification(s) to that effect.

Thus, there is an ongoing technological problem with protecting vehicle occupants that may be incapable of doing so themselves.

SUMMARY

One aspect of this disclosure involves a vehicle occupant safety method. The method involves: a) receiving data from multiple sensors within a vehicle, via a monitor aggregator, at a processor within the vehicle, the multiple sensors including at least one carbon monoxide (CO) sensor and GPS sensor; b) using a decision engine running on the processor i) comparing the sensor data, received by the processor against a set of sensor parameters to determine whether any of multiple potential danger conditions exists within the vehicle, and ii) determining which of multiple control actions are to be automatically taken, via a vehicle electronic control system, coupled to the processor and vehicle component controls, when some danger condition is determined to exist within the vehicle; c) wherein, when a specified danger condition relating to CO level alone, or in combination with vehicle interior temperature, exists, and based upon the sensor data, causing, using the processor, the vehicle component controls to modify operation of at least one vehicle component that is coupled to the vehicle component controls; d) determining, using the decision engine, i) based upon further sensor data, that the specified danger condition either: A) is persisting for longer than a specified period of time, or B) has exceeded at least one specified severity threshold; and ii) using GPS location information from the GPS sensor, A) whether or not the vehicle is in an unsafe location, and B) whether the vehicle is occupied and where any occupants are located, e) based upon a result of "d)", determining how to further modify operation of any vehicle component or take any of at least two specified escalation actions available for the same specified danger condition; f) following "e)", continuing to make determinations regarding the specified danger condition, using the decision engine; and g) based upon a result of the determinations in "f)" taking further control actions, via the vehicle electronic control system, or further specified escalation actions, until the specified danger condition no longer exists.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to address the aforementioned problems. Our technical solution improves upon current approaches, for example, those that seek to protect occupant(s), typically children, left alone in a car, that deal with a single issue—temperature—in a "one size fits all" approach.

Our system uses a decisional approach that takes advantage of sensors that are already present in a vehicle, as well as allowing for additional sensors from third parties to be added, to make decisions based upon the sensor input to address danger conditions and, more importantly, in an advance over the current art, when a dangerous condition exists, our system does not merely react, it continues to monitor the situation via the sensors to determine if a danger condition persists or has changed and can take further control and/or escalation action(s), if warranted, as a result.

Figure 1:
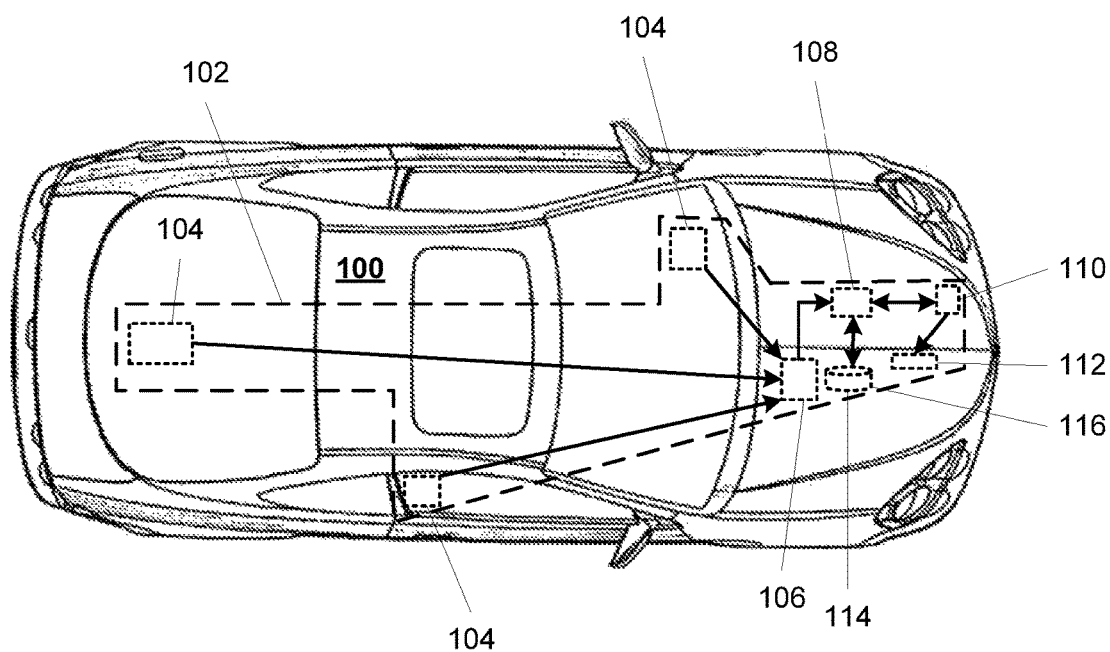
FIG. 1 illustrates, in simplified form, one example representation of a vehicle incorporating an occupant safety system as described herein.

FIG. 1 illustrates, in simplified form, one example representation of a vehicle 100 incorporating an occupant safety system 102 as described herein.

The occupant safety system 102 includes multiple sensors 104 within the vehicle 100 (only some of which are shown). Depending upon the particular implementation, the sensors 104 may be integrated as part of the vehicle, or they may be third-party sensors that can be added later, for example, sensors that are constructed, for example, to communicate according to the Universal Plug and Play (UPnP) standard set forth in the international standard adopted by the ISO and International Electrotechnical Commission, Standard ISO/IEC 29341.

The occupant safety system 102 further includes a monitor aggregator 106 that is coupled to the sensors 104 and converts the sensor outputs into a common form and format.

The occupant safety system 102 also includes at least one processor 108 coupled to the monitor aggregator 106 so that it can receive the converted data from the sensors 104 and use that data as described in greater detail herein.

The (at least one) processor 108 is also coupled to the vehicle's electronic control system 110 that allows the vehicle to operate the vehicle component controls 112, for example, the controls for turning on/off the ignition, raising/lowering the windows, opening/closing a sunroof/moon roof, turning on/off the air conditioning/heating system, and/or any autonomous vehicle functions, if present, like automatic parking and/or adaptive cruise control. In short, the vehicle component controls 112 are any controls in the vehicle that can be used to automatically manipulate (e.g., turn on/off, raise/lower, open/shut, start/stop, adjust, etc.) any component(s) of the vehicle or cause a vehicle component (e.g., a cellular phone) to take some specified action(s).

The system further includes storage 114, accessible to the processor 108, that stores format defining data structures, data-containing structures, and program instructions, in a non-transitory manner, for example, such as non-transient solid state memory, a magnetic hard drive, a CD or DVD, a tape drive, or an analogous or equivalent storage medium type would. Programming stored within the storage 114 that can be executed by the processor 108 implements a decision engine 116 that uses the data from the sensors 104 to make decisions regarding the presence of occupants, conditions within the vehicle, occupant condition and potentially dangerous circumstances, in order to identify when a danger condition exists within the vehicle 100 and can take actions to cause certain control and/or escalation actions to be undertaken, as described herein, based upon that information.

Figure 2:
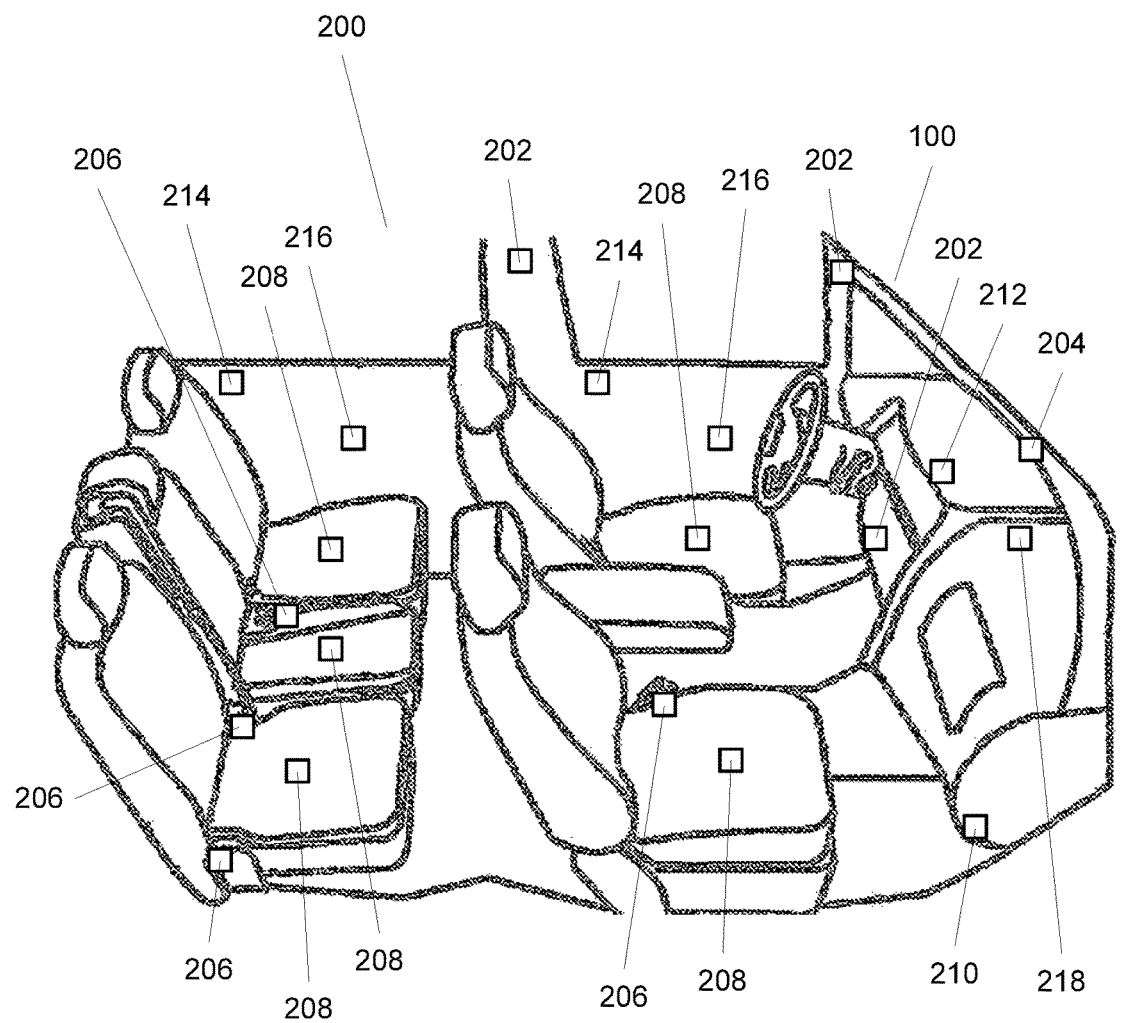
FIG. 2 illustrates, in simplified form, a partial representation of an interior of the vehicle of FIG. 1.

FIG. 2 illustrates, in simplified form, a partial representation of an interior 200 of the vehicle 100 of FIG. 1.

As shown in FIG. 2, the vehicle 100 specifically includes, by way of example, various different types of sensors 104, for example, motion sensor(s) 202, sound sensor(s) 204, seat belt latch sensors 206, seat occupancy (weight) sensors 208, interior temperature sensor(s) 210, a global positioning satellite (GPS) system sensor 212, door lock position sensor(s) 214, and interfaces 216, 218 via which third-party sensor's, for example, heart rate monitor(s), infrared sensor(s), carbon monoxide (CO) or other harmful exhaust gas sensors, etc., can be coupled to the monitor aggregator 106.

In operation, the decision engine 116 will receive data from the sensors 104 that it receives via the monitor aggregator 106 and compare that data, in aggregate, against various sensor parameters in order to identify whether a potential danger condition exists within the vehicle 100. Depending upon the particular sensor and what is being sensed, the parameters can be simple binary values, i.e., to represent whether a seat is occupied or not, or they could be indicative of, or actually, a numerical value, for example, parts per million (ppm) for gasses. Examples of such parameters would be, whether or not the engine is running, whether the vehicle is occupied, the interior temperature level, exterior temperature, positions of windows, vents and/or door locks (upper/lower boundary), CO/exhaust gas level (in ppm), whether there is motion within the vehicle, whether the vehicle is moving, etc. Based upon that comparison, when a danger condition does exist, the decision engine could determine which, if any, control action(s) to take and, using the processor, cause the state/operation of one or more vehicle components to be modified via the vehicle component controls 112.

Advantageously, as part of the process, the decision engine can be programmed to take into account local laws, to some extent, based upon GPS location. For example, in some states, it is against the law for children to ride in the front seat of a vehicle with back seats. In such cases, for maximum safety, the decision engine can be programmed to presume that a lone front passenger seat occupant is an adult and a lone back seat occupant is a child if the GPS indicates that it is in a state that has such laws.

In contrast to existing systems that are simply reactive and operate in an "if-then" manner, e.g., excessive temperature in an occupied vehicle, then open windows and/or send an alert, the instant vehicle safety system makes decisions based upon the sensor input, so that the same danger condition (e.g., excessive interior temperature) could yield different actions depending upon other factors, for example, how many people are in the vehicle, where they are seated, where the vehicle is located, etc.

Thus, for example, if the vehicle is occupied in a seat other than the driver's seat, and the temperature is beyond a heat threshold temperature, based upon the sensor data, the decision engine could determine whether the proper control action(s) would be to open one or more windows and/or the sunroof/moon roof or, based upon GPS sensor information indicating that the vehicle is in an area where it is not unsafe to open the windows, it will cause the vehicle component controls 112 to lock the doors (if unlocked) and turn on the engine and the air conditioning. In contrast, under the same sensed circumstance, if the driver's seat is also occupied (or the only occupied seat) it might take no action or merely cause an indicator light to be lit in the vehicle. Likewise, if the driver's seat was occupied, but a motion sensor identified no motion within a given window of time and/or heart rate monitor sensor identified an excessively high or low heart rate, the decision engine would open the windows, trigger the horn and flash the headlights to attract attention.

In a similar vein, if the sensors indicated a high CO level in the vehicle the decision engine might take one action if the vehicle has no vehicle occupants, a different action if the vehicle is occupied, and further differentiate those actions based upon the external temperature, whether the occupants are moving, and/or where they are seated.

Still further, and in contrast to existing approaches, a decision engine 116 operating as described herein will continue receiving sensor data even after it has determined that a danger condition exists and has taken some action. As a result, the decision engine 116 can determine that the danger condition has—either or both: (i) persisted for longer than some specified period of time (which may be different depending upon the nature of the danger condition and/or its severity, (ii) exceeded a severity threshold associated with that particular danger condition. If the decision engine 116 determines that either (i) or (ii) has occurred, the decision engine will determine whether to further modify operation of some vehicle component or take some specified escalation action. By way of example, the severity threshold could involve some numerical value, for example crossing a second temperature threshold indicating a worsening temperature situation accompanied by a failure to detect motion when previously motion was detected, or it could involve some other non-numerical circumstance that nevertheless represents a worsening danger, like a persistent elevated carbon monoxide level even though the windows have been lowered and the fan turned on.

Such further operation or escalation action could include, in one illustrative example, if a danger condition relating to interior temperature has persisted for more than a certain period of time even though the air conditioning has been turned on, the decision engine 116 might cause the vehicle component controls 112 to open the windows even if it initially determined the windows should not be opened based upon GPS location information because the area was considered "unsafe" or, in the case of a vehicle with autonomous driving capability, if infrared sensors determined that there was a cooler area that is open and ahead of or near the vehicle (perhaps in a different open parking space shaded by a building or one or more trees) the vehicle might be controlled to move into the cooler area, or, in some cases, do both.

By way of another illustrative example, if a high carbon monoxide level persisted in the vehicle, despite opening the windows and turning on the fan, perhaps because the vehicle is in an enclosed space, the decision engine 116 could cause the vehicle component controls 112 to shut off the engine and concurrently do one or more of: sounding the horn (using the universally recognized "S-O-S" signal), repeatedly raising and/or lowering of the windows, triggering the vehicle's alarm system and/or flashing the vehicle's lights, so as to attract maximum attention.

After a danger condition has been identified, the decision engine 116 will continue to monitor the situation and make determinations regarding the danger condition and decide if further actions are to be taken via the vehicle electronic control system, or if further escalation actions specified for the particular danger condition until the danger condition no longer exists.

Moreover, the continued monitoring by the decision engine 116 allows for identification of further danger conditions that me be a result of, or even caused by, the reaction to the original danger condition, and can react to mitigate the new situation. For example, the reaction to an excessive temperature condition might be to turn on the engine and air conditioning, but that action could lead to drawing in excessive carbon monoxide into the car. As a result, the continued monitoring will allow the decision engine to continue to make determinations, based upon data from the sensors, that the air conditioning option is no longer viable and modify its action(s) or take entirely different action(s) to deal with the combined excessive heat and elevated carbon monoxide circumstances as a new danger condition.

Thus, advantageously, vehicle occupant safety systems constructed to operate according to the teachings herein can not only identify and react to a danger condition, they can take increasing escalation steps (which can include modifying existing steps then-being taken) if the danger condition persists, changes or worsens. Likewise, once a danger condition has caused the decision engine 116 to take such escalated action, variants of the decision engine 116 can gradually de-escalate as the danger condition abates and re-escalate if the danger condition resumes and/or a new danger condition occurs and continue to do so until the danger condition(s) no longer exists.

Independent of the foregoing, optionally, with some implementations, if the vehicle is equipped with an in-vehicle cellular phone system, when any danger condition persists or an escalation action is taken, optionally, the vehicle component controls 112 might also automatically send a pre-recorded message to emergency services (a.k.a. 9-1-1) along with the GPS coordinates of the vehicle, and possibly some indication of the situation.

Figure 3:
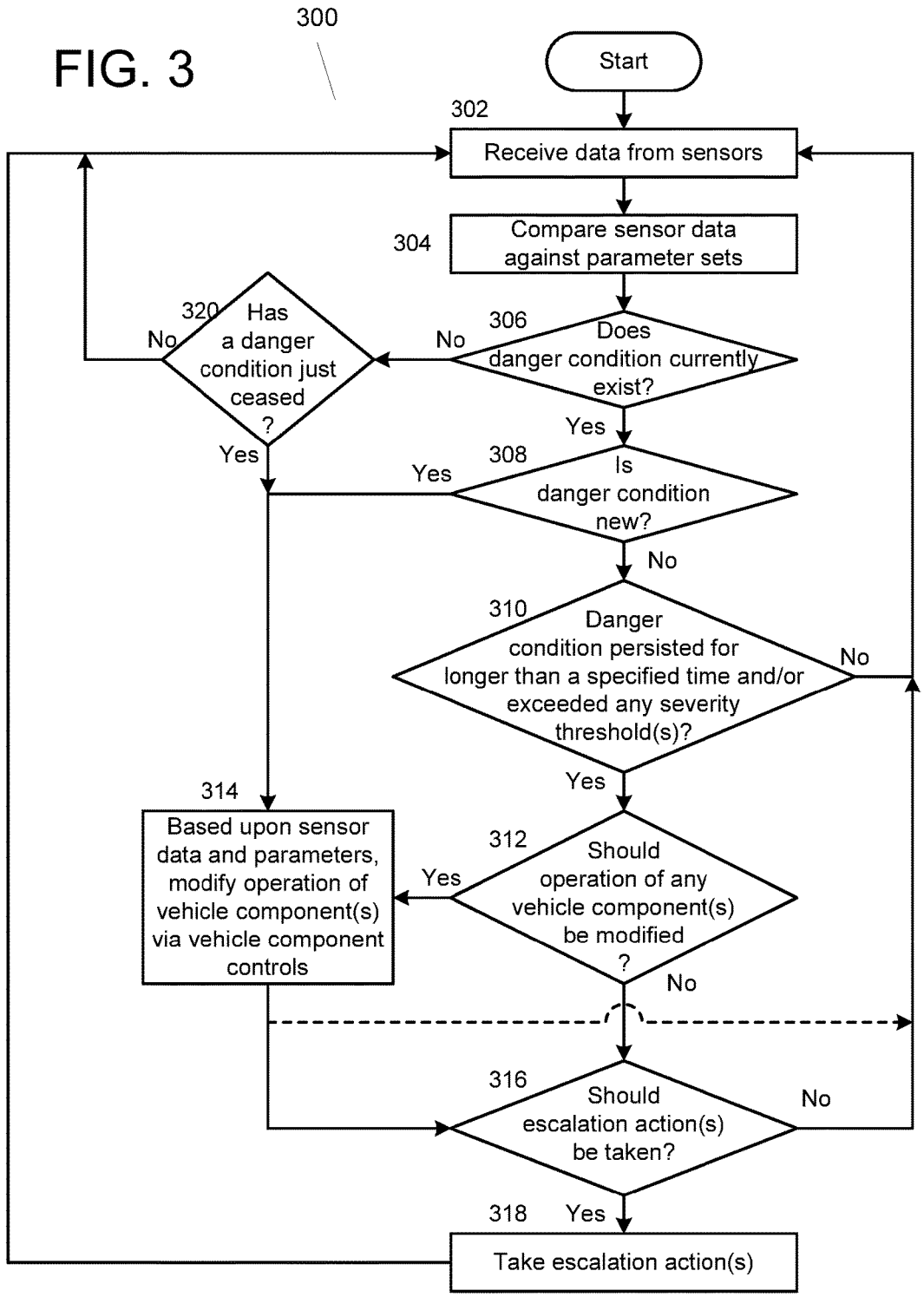
FIG. 3 illustrates, in simplified form, a flowchart for one representative example of a method performed by an example vehicle occupant safety system configured as described herein.

FIG. 3 illustrates, in simplified form, a flowchart 300 for one representative example of a method performed by an example vehicle occupant safety system configured as described herein. It is to be noted that the steps described in the flowchart 300, will be performed by the decision engine 116 implemented by non-transiently stored programming that is retrieved and executed by on one or more processors in the vehicle.

Typically the process will run both while the vehicle is running and when it is not running. However, to avoid running down the vehicle's battery, the vehicle occupant safety system may include its own rechargeable battery, or it may be configured to "sleep" (i.e., go into an extremely low power usage state) when certain conditions are met, for example, the vehicle has been off for more than some significant period of time, the sensor data has all been within some normal range during that time, and no vehicle occupants have been detected, and, thereafter, while in the "sleep" state, will periodically check for sensor data indicating at least one occupant (e.g., human or animal) is in the vehicle, for example, based upon the motion and/or seat or other sensor data, at which point it will "wake" and begin monitoring.

The process thereafter begins with the decision engine 116 receiving sensor data via the monitor aggregator 106 (Step 302). The received data is then compared against parameter sets that are non-transiently stored in storage in the vehicle (Step 304) to determine if a danger condition currently exists within the vehicle (Step 306). If the decision engine 116 determines that a danger condition does currently exist, the decision engine 116 will determine whether the existing danger condition is new or ongoing (Step 308). If the danger condition is new, then, based upon the sensor data and parameters, the decision engine will modify operation of one or more vehicle component(s), via the vehicle component controls 112 (Step 314) in an attempt to alleviate the danger condition. As shown in the flowchart 300, the decision engine 116 then checks whether any escalation action(s) should be taken (Step 316). However, depending upon the particular implementation, for this specific path, since this danger condition is new, this check could be bypassed (shown by the dashed line) and the process would return to the monitoring loop (Step 302 through Step 306).

If the decision engine 116 determines in the monitoring loop (Step 302 through Step 306) that a danger condition does not exist, the decision engine 116 will determine whether this is a result of a prior danger condition just ceasing (i.e., it no longer exists) (Step 320) or if everything continues to be normal. If everything has been normal, the answer will be "No" and the process will return to the monitoring loop (Step 302 through Step 306).

If, at Step 308, the decision engine 116 determines that the danger condition is not new (i.e., it has already previously been identified and persists), the determination engine 116 will determine whether the danger condition has persisted for too long (i.e., for longer than some specified period of time (which may be different for different danger conditions)) and/or has exceeded any severity threshold(s) (Step 310). If neither is the case, the decision engine will continue to monitor the situation by returning to the monitoring loop (Step 302 through Step 306). If, however, the decision engine 116 determines in Step 310 that either is true, the decision will determine whether the operation of any vehicle components should be modified (Step 312) and, if so, it will do so (Step 314). Both, after passing through Step 312 or if the decision engine determines that no vehicle components should be modified, the decision engine will determine whether any escalation action(s) should be taken (Step 316). If not, the process will again return to the monitoring loop (Step 302 through Step 306). If so, the decision engine will take the appropriate escalation actions (based upon the particular danger condition in effect and persistence and/or severity threshold(s) exceeded) (Step 318) and return to the monitoring loop (Step 302 through Step 306).

At this point, it should be understood that, depending upon the particular implementation of the system and process, the decision engine may maintain certain data that will enable it to track one or more concurrent danger conditions, individually or in aggregate. Thus, when a particular danger condition is first identified, it may be assigned an identification number and then as the process progresses conditions (e.g., the sensor data) may be tracked and some or all may be retained, for example, to determine persistence, adverse or favorable changes over time, or interrelated danger conditions (based upon an implied, or possible, cause/effect relationship). Advantageously, by doing so, the decision engine 116 can operate more effectively in taking the appropriate action(s) when a danger condition exists. Moreover, for a given set of sensor data, it can take different actions depending upon the "history" of that danger condition and/or any other current, or recently ended danger conditions, thereby allowing it to recognize from the same current data conditions the difference between an isolated danger condition and one that may have been triggered by a prior, alleviated condition. For example, by tracking the sensor information the decision engine will be able to differentiate between the circumstance where an occupant may have gone to sleep in the vehicle and then, over time, an over-temperature condition occurs from a situation where a persistent over-temperature condition has recently been alleviated, but thereafter the occupant(s) suffer a medical emergency (e.g., pass out) due to the lasting effect of that prior danger on them and thus, are not merely "taking a nap" in the vehicle.

Returning to the flowchart 300, if, as part of the monitoring loop (Step 302 through Step 306) it is determined that a danger condition does not currently exist (Step 306) but a danger condition has just ceased (Step 320), the decision engine can act to potentially "undo" some/all of its prior actions by again modifying operation of vehicle component(s) via the vehicle component controls (Step 314) and then returning to the monitoring loop (Step 302 through Step 306), for example, via the dashed line path shown.

Thus, it should be recognized and understood that vehicle occupant safety systems constructed and operating according to the teachings herein are much more adaptable than current systems that operate in a simple "if/then" fashion (e.g., if temperature exceeds a threshold, then open the windows and honk the horn and if temperature goes down enough below the threshold then reverse the process).

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A vehicle occupant safety method comprising:
a) receiving data from multiple sensors within a vehicle, via a monitor aggregator, at a processor within the vehicle, the multiple sensors including at least one carbon monoxide (CO) sensor and GPS sensor;
b) using a decision engine running on the processor
   i) comparing the sensor data, received by the processor against a set of sensor parameters to determine whether any of multiple potential danger conditions exists within the vehicle, and
   ii) determining which of multiple control actions are to be automatically taken, via a vehicle electronic control system, coupled to the processor and vehicle component controls, when some danger condition is determined to exist within the vehicle;
c) wherein, when a specified danger condition relating to CO level alone, or in combination with vehicle interior temperature, exists, and based upon the sensor data, causing, using the processor, the vehicle component controls to modify operation of at least one vehicle component that is coupled to the vehicle component controls;
d) determining, using the decision engine,
   i) based upon further sensor data, that the specified danger condition either:
      A) is persisting for longer than a specified period of time, or
      B) has exceeded at least one specified severity threshold; and
   ii) using GPS location information from the GPS sensor,
      A) whether or not the vehicle is in an unsafe location, and
      B) whether the vehicle is occupied and where any occupants are located,
e) based upon a result of "d)", determining how to further modify operation of any vehicle component or take any of at least two specified escalation actions available for the same specified danger condition;
f) following "e)", continuing to make determinations regarding the specified danger condition, using the decision engine; and
g) based upon a result of the determinations in "f)" taking further control actions, via the vehicle electronic control system, or further specified escalation actions, until the specified danger condition no longer exists.

* * * * *